(12) United States Patent
Schroeder et al.

(10) Patent No.: US 9,071,164 B2
(45) Date of Patent: Jun. 30, 2015

(54) MULTI-PHASE CONVERTER SYSTEM AND METHOD

(75) Inventors: Stefan Schroeder, Munich (DE); Piniwan Thiwanka Bandara Wijekoon, Munich (DE)

(73) Assignee: General Electric Company, Niskayuna, NY (US)

( * ) Notice: Subject to any disclaimer, the term of this patent is extended or adjusted under 35 U.S.C. 154(b) by 251 days.

(21) Appl. No.: 13/315,660

(22) Filed: Dec. 9, 2011

(65) Prior Publication Data

US 2013/0148397 A1 Jun. 13, 2013

(51) Int. Cl.
*H02M 7/537* (2006.01)
*H02M 7/487* (2007.01)
*H02M 1/00* (2007.01)
*H02M 7/483* (2007.01)

(52) U.S. Cl.
CPC ...... *H02M 7/487* (2013.01); *H02M 2001/0025* (2013.01); *H02M 2007/4835* (2013.01)

(58) Field of Classification Search
USPC ........................................... 363/71, 131–132
See application file for complete search history.

(56) References Cited

U.S. PATENT DOCUMENTS

| | | | |
|---|---|---|---|
| 5,642,275 A | 6/1997 | Peng et al. | |
| 5,933,339 A * | 8/1999 | Duba et al. | 363/71 |
| 5,936,856 A * | 8/1999 | Xiang | 363/98 |
| 5,986,909 A | 11/1999 | Hammond et al. | |
| 7,230,837 B1 | 6/2007 | Huang et al. | |
| 7,315,160 B2 * | 1/2008 | Fosler | 323/285 |
| 7,869,234 B2 | 1/2011 | Kazlauskas | |
| 2005/0162137 A1 * | 7/2005 | Tracy et al. | 323/217 |
| 2008/0303489 A1 * | 12/2008 | Park et al. | 322/20 |

FOREIGN PATENT DOCUMENTS

WO WO2009132427 A1 5/2009

OTHER PUBLICATIONS

Aziz, J. A.; Muhamad, N. D., "Experimental evaluation of three phase hybrid buck rectifier", 2nd IEEE International Conference on Power and Energy (PECon08), Dec. 1-3, 2008, pp. 1479.

Aziz, Junaidi Abdul; Klumpner, Christian Clare, "A Hybrid Approach to Improve the Robustness Against Unbalanced Voltage Supply and Cancel the Common Mode Voltage for a 3-ph Buck-Type Rectifier", 12th International Power Electronics and Motion Control Conference, EPE-PEMC 2006, Aug. 30, 2006-Sep. 1, 2006, pp. 653.

(Continued)

*Primary Examiner* — Adolf Berhane
*Assistant Examiner* — Henry Lee, III
(74) *Attorney, Agent, or Firm* — Andrew J. Caruso

(57) ABSTRACT

A multi-phase converter includes a plurality of phase paths. Each phase path includes at least one dc-link that is independent from every other phase path dc-link such that each output phase voltage is generated from a corresponding dc-link voltage source that can be different from every other phase voltage dc-link voltage source. A total dc-link voltage level is determined for each output phase voltage. A common-mode injection voltage is calculated based on all dc-link voltage levels and all phase reference voltages. Each phase path reference voltage is then adjusted based on the calculated common-mode injection voltage, such that each generated output phase voltage level is adjusted in response to its corresponding adjusted reference voltage.

6 Claims, 3 Drawing Sheets

(56) References Cited

OTHER PUBLICATIONS

Wang, Z. H.; Yin, X. G.; Cheng, H. X.; Zhang, Z.; Yang, J. C., "A novel PWM scheme to eliminate common-mode voltages in cascaded multi-level inverters", IEEE PES Transmission and Distribution Conference and Exposition, Sep. 7-12, 2003, vol. 2, pp. 780.

D. Grahame Holmes; Thomas A. Lipo, "Pulse width modulation for power converters: principles and practice", IEEE press series on power engineering, 2003, pp. 226.

Staffan Norrga, Cost-effective power electronic interfaces for three-phase four-wire microgrids, Nov. 30, 2009.

Fei Wang, "Sine-triangle versus space-vector modulation for three-level PWM voltage-source inverters", IEEE Transactions on Industry Applications, Mar./Apr. 2002, vol. 38, Issue 2, pp. 500.

C. S. MA; T. J. Kim; D. W. Kang; D. S. Hyun, "A simple control strategy for balancing the DC-link voltage of neutral-point-clamped inverter at low modulation index", Journal of Power Electronics, Oct. 2003, pp. 205.

Search Report and Written Opinion from corresponding PCT Application No. PCT/US2012/068328 dated Sep. 20, 2013.

* cited by examiner

MULTI-PHASE CONVERTER SYSTEM AND METHOD

BACKGROUND

The subject matter of this disclosure relates generally to multi-phase power converter topologies, including without limitation those converter topologies based on H-bridges, and more particularly to a modulation scheme for such multi-phase converters to provide better utilization of a given dc-link voltage by injection of a suitable common-mode voltage to all voltage reference signals.

State-of-the-art modulation schemes for multi-phase converters provide better utilization of a given dc-link voltage by injection of a suitable common-mode voltage to all voltage reference signals. The known schemes provide optimal utilization of the dc-link voltage when all phase voltages are generated from a common dc-link. The known schemes however, are disadvantageous in that they can only use the voltage up to the minimum voltage level, which reduces the output voltage or requires bulky dc-link capacitor.

Although such known schemes are common for standard topologies, these schemes are not capable of providing optimal utilization of the dc-link voltage when each phase voltage is generated from an independent dc-link voltage source such as implemented by multi-phase power converter topologies based on H-bridges.

In view of the foregoing, there is a need to provide a modulation scheme for multi-phase converters that employ H-bridge topologies and that provides a more optimal use of dc-link voltages than that achievable using state-of-the-art modulation schemes for multi-phase converters.

BRIEF DESCRIPTION

A method of operating a power converter according to one embodiment comprises:

providing a multi-phase converter comprising a plurality of phase paths, wherein each phase path comprises at least one dc-link that is independent from and isolated from every other phase path dc-link;

generating a plurality of output phase voltages via the multi-phase converter in response to a predetermined reference voltage for each phase, wherein each output phase voltage is based on a corresponding dc-link voltage source that can be different from every other phase voltage dc-link voltage source;

measuring a total dc-link voltage level associated with each output phase voltage;

calculating a first difference voltage based on the positive total dc-link voltage and the predetermined reference voltage level for each phase;

calculating a second difference voltage based on the negative total dc-link voltage and the predetermined reference voltage level and for each phase;

calculating a maximum second difference voltage for all phases;

calculating a minimum first difference voltage for all phases;

choosing a common mode injection voltage for all phases in between the maximum second difference voltage and the minimum first difference voltage for all phases; and adding the common mode injection voltage to the predetermined reference voltage for each phase, such that each generated output phase voltage level is adjusted in response to its corresponding adjusted reference voltage.

According to another embodiment, the common mode injection voltage is calculated as the average of the maximum second difference voltage and the minimum first difference voltage for all phases.

According to another embodiment, the converter comprises H-bridges based on 3-level phase-legs and dc-links with a positive and a negative half dc-link. Calculating the total dc-link voltage for each phase is accomplished by calculating the difference of the positive half dc-link voltage and the negative half dc-link voltage.

According to another embodiment, the converter comprises multiple H-bridges per phase and multiple corresponding dc-links per phase. Calculating the total dc-link voltage for each phase is accomplished by calculating the sum of all dc-link voltages per phase.

DRAWINGS

The foregoing and other features, aspects and advantages of the invention are apparent from the following detailed description taken in conjunction with the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

Figure 1:
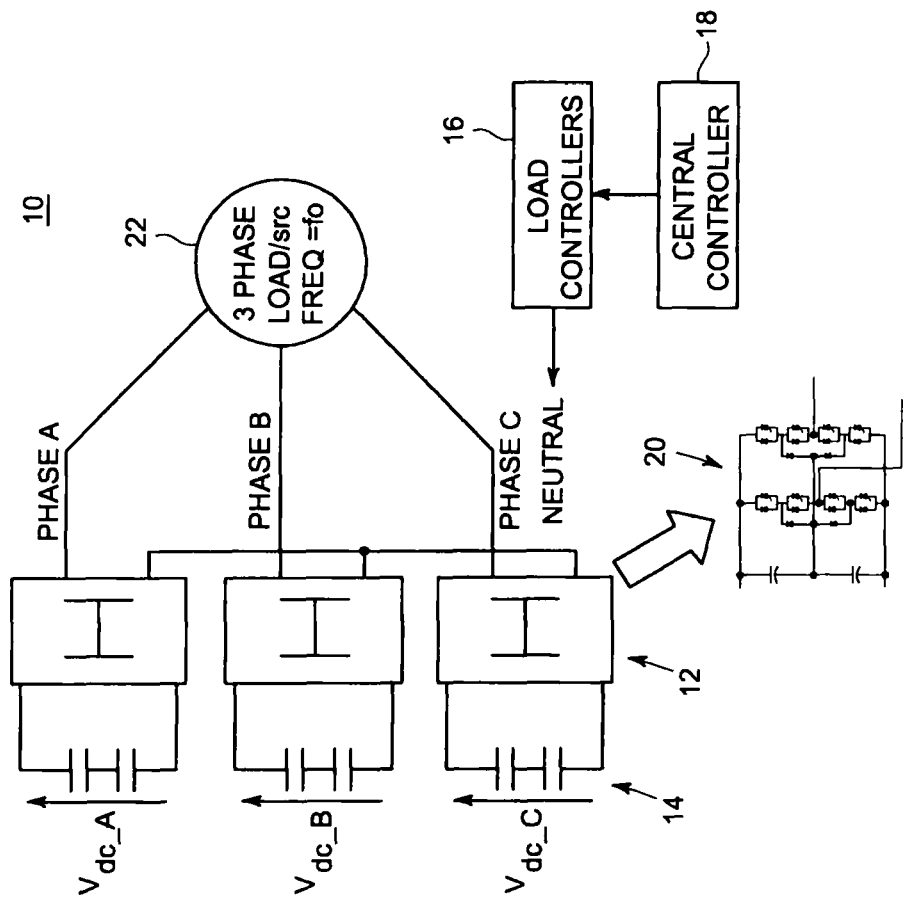
FIG. 1 illustrates a multi-phase power converter according to one embodiment.

FIG. 1 illustrates a multi-phase power converter 10 according to one embodiment. Converter 10 can be seen to employ a plurality of active H-bridge inverters 12. Each H-bridge inverter 12 is coupled to a corresponding dc-link 14. Each phase output voltage is based on its own dc-link voltage that is distinct and independent from every other dc-link voltage. According to one embodiment, the converter 10 H-bridge inverters 12 are each also coupled to corresponding phase connections of a three-phase load/source 22 with a fundamental operating frequency $f_o$.

According to one embodiment, converter 10 also employs one or more local controllers 24, and may further employ a central or main controller 26. The local controller(s) 24 and/or central controller 26 are configured with algorithmic software and/or firmware that is programmed to derive an optimal common-mode injection voltage for each phase based on actually available voltages in each phase.

State-of-the-art modulation schemes for multi-phase converters such as three-phase converters provide better utilization of a given dc-link voltage by injection of a suitable common-mode voltage to all voltage reference signals, as stated herein. Known schemes applied to standard converter topologies provide such optimal utilization of the dc-link voltage when all phase voltages are generated from a common dc-link, unlike the converter topology depicted in FIG. 1. Such modulation schemes are sub-optimal when applied to a converter 10 such as shown in FIG. 1, since each phase output voltage of converter 10 is generated from its own dc-link that is distinct and independent from every other dc-link.

According to one embodiment, modulation of a multi-phase converter 10 such as the one depicted in FIG. 1 is accomplished by considering the actually available dc-link voltage in each phase individually, and then deriving an optimal common-mode voltage for each phase based on its own dc-link voltage that may be different from every other phase dc-link voltage. One suitable method for operating a multi-phase converter is described in further detail herein with reference to FIG. 2. The present inventors found that converter output power could be increased by at least 5% using the principles described herein. Further, a reduction in dc-link capacitance may result in some applications where a higher voltage ripple can be tolerated.

With continued reference to FIG. 1, one or more local controllers 16 are generally programmed with a predetermined reference voltage that controls a modulation index for each inverter 12. Alternatively, the predetermined reference voltage can be generated via a central controller 18 that communicates with local controllers 16 to control the modulation index for each inverter 12.

Converter 10 can be seen to include a plurality of phase paths A, B and C, wherein each phase path comprises a dc-link 14 that is independent from and isolated from every other phase path dc-link as stated herein. During normal operation, each phase path dc-link voltage typically sees a ripple voltage that is phase shifted 120° from every other phase path and that is generated at a frequency of $2f_0$.

According to one embodiment, each inverter 12 is implemented with a 3-level neutral-point clamped (3L-NPC) H-bridge 20. Each output phase voltage is then generated by a corresponding H-bridge inverter 20 in response to a predetermined reference voltage that determines how each controller 16 will modulate its corresponding 3L-NPC H-bridge inverter 20.

Figure 2:
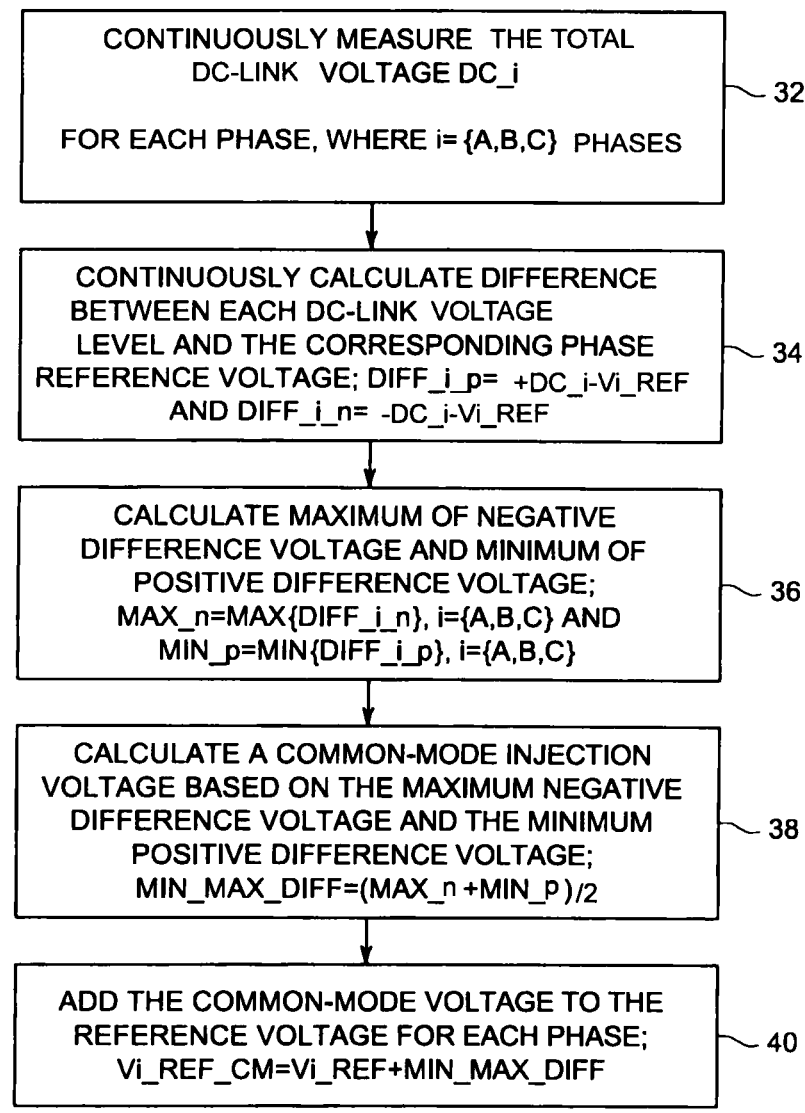
FIG. 2 is a flow chart illustrating a method of operating a multi-phase power converter according to one embodiment.

Looking now at FIG. 2, a flow chart 30 illustrates a method of operating a multi-phase power converter with isolated dc-links using the principles described herein according to one embodiment. The desired modulation index for each phase A, B, C, is determined according to one embodiment by first measuring the total dc-link voltage level associated with each output phase voltage as represented by block 32.

A first difference voltage is then calculated based on the predetermined reference voltage level and the positive dc-link voltage for each phase, and a second difference voltage is also calculated based on the predetermined reference voltage level and the negative dc-link voltage for each phase as represented by block 34.

A maximum second difference voltage is determined from the calculated second difference voltage for each phase, and a minimum first difference voltage is determined from the calculated first difference voltage for each phase as represented in block 36.

Subsequent to determination of the maximum second difference voltage and minimum first difference voltage as represented in block 36, a common-mode injection voltage is calculated as the average of the maximum second difference voltage and the minimum first difference voltage for each phase as represented in block 38.

The common-mode injection voltage calculated in block 38 is then added to the predetermined reference voltage for each phase to generate an adjusted reference voltage, such that each generated output phase voltage level is adjusted in response to its corresponding adjusted reference voltage as represented in block 40.

Figure 3:
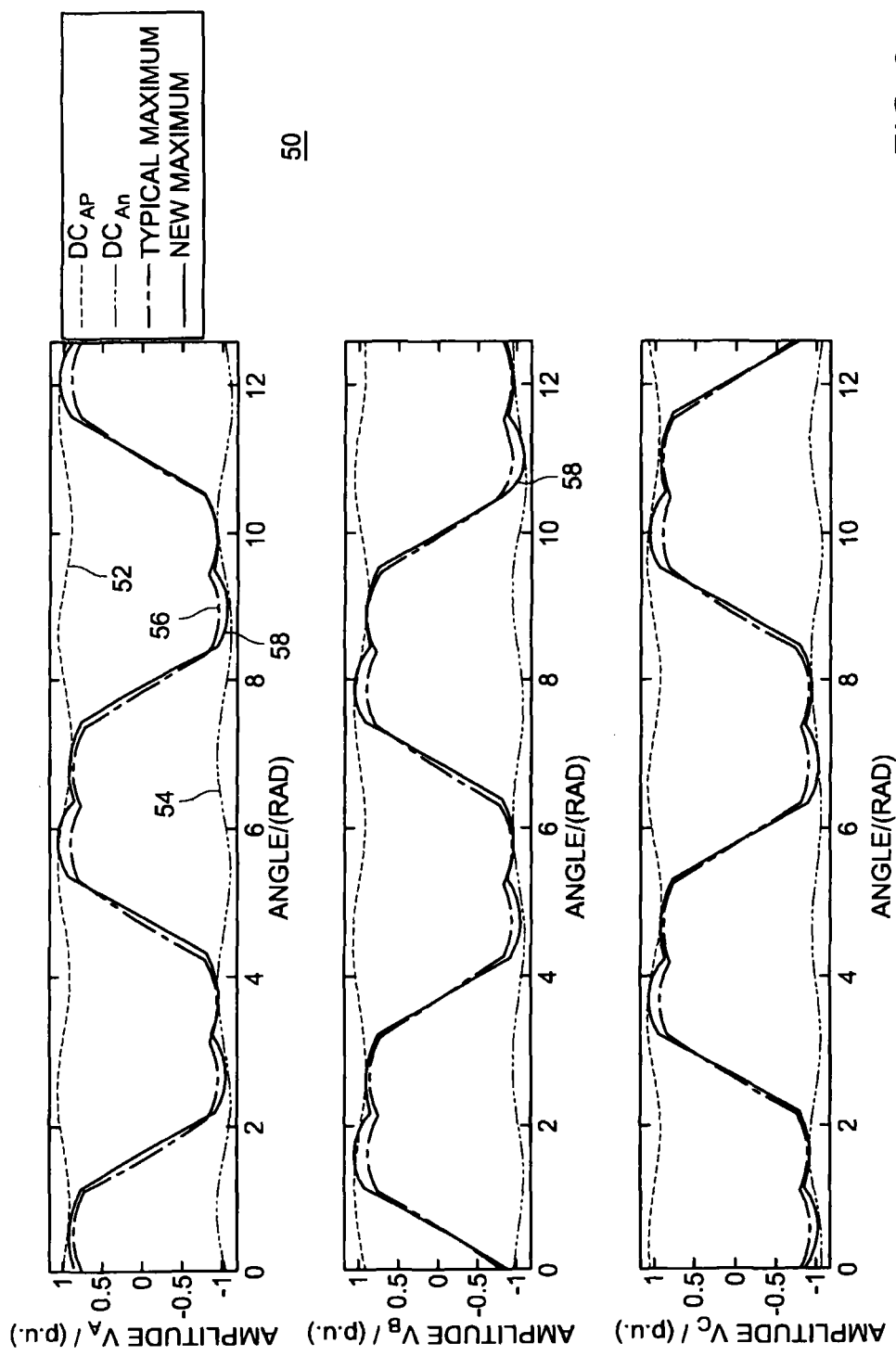
FIG. 3 is a graph illustrating output voltage gain for a multi-phase power converter having an independent dc-link voltage source for each phase and using a common-mode injection voltage for each phase based on dc-link ripple voltage according to one embodiment.

FIG. 3 is a graph 50 illustrating output voltage gain for a multi-phase power converter having an independent dc-link voltage source for each phase and using a common-mode injection voltage for each phase based on dc-link ripple voltage according to one embodiment. Each dc-link has a ripple voltage that is phase shifted 120° from every other dc-link ripple voltage. The graphs shown in FIG. 3 are representative for a dc-link with a 15% peak-to-peak dc-link ripple voltage. The upper dotted line 52 represents an average positive DC voltage for each dc-link while the lower dotted line 54 represents an average negative DC voltage for each dc-link. Normalized phase output voltages 56, 58 are depicted for a multi-phase power converter that is modulated using a typical common-mode injection scheme and also for a common-mode injection scheme using the principles described herein respectively. A comparison between the normalized output voltages 56 and 58 shows a gain of about 7.8% in favor of the common-mode injection scheme using the principles described herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of operating a multi-phase converter, the method comprising:
   providing a multi-phase converter comprising a plurality of phase paths and a plurality of dc-links, wherein each phase path comprises at least one corresponding dc-link that is independent from the dc-link for every other phase path;
   generating a plurality of output phase voltages via the multi-phase converter in response to a predetermined reference voltage for each phase derived from the at least one corresponding dc-link, wherein each output phase voltage is based on voltage for the at least one corresponding dc-link that is independent from voltage for other of the dc-links for every other phase;
   determining a total dc-link voltage level associated with each output phase voltage;
   calculating a first difference voltage based on the predetermined reference voltage level and a positive dc-link voltage for each phase;
   calculating a second difference voltage based on the predetermined reference voltage level and a negative dc-link voltage for each phase;
   calculating a maximum of the second difference voltage for each phase;
   calculating a minimum of the first difference voltage for each phase;
   calculating a common-mode injection voltage as the average of the maximum second difference voltage and the minimum first difference voltage for each phase; and
   adding the common mode injection voltage to the predetermined reference voltage for each phase and controlling a modulation index therefrom for each phase, such that each generated output phase voltage level for each phase is adjusted in response to its corresponding modulation index.

2. The method according to claim 1, wherein providing a multi-phase converter comprises providing a multi-phase converter based on H-bridges.

3. The method based on claim 1, wherein determining the total dc-link voltage is accomplished by measuring the at least one corresponding dc-link voltage level.

4. The method based on claim 1, wherein determining the total dc-link voltage is accomplished by calculations based on a converter model.

5. A multi-phase power converter comprising:
a plurality of phase paths, and a plurality of dc-links, wherein each phase path comprises at least one corresponding dc-link that is independent from every other of the dc-links, wherein the multi-phase power converter is configured to generate a plurality of output phase voltages in response to a set of predetermined reference voltages configured such that there was an individual reference voltage for each phase, and further wherein each output phase voltage is based on the at least one corresponding dc-link voltage source that is independent from others of the dc-links voltage sources; and
one or more controllers programmed and configured to:
determine a total dc-link voltage level associated with each output phase voltage;
calculate a first set of difference voltages based on voltage levels for each of the individual reference voltages for the set of predetermined reference voltages and a corresponding set of positive dc-link voltages such that there is one first difference voltage for each phase;
calculate a second set of difference voltages based on voltage levels for each of the individual reference voltages for the set of predetermined reference voltages and a corresponding set of negative dc-link voltages such that there was one second difference voltage for each phase;
calculate a set of maximums of the second difference voltages such that there is one for each phase;
calculate a set of minimums of the first difference voltages such that there is one for each phase;
calculate a set of common-mode injection voltages that are averages of the maximum second difference voltages and the minimum first difference voltages performed for respective phases such that there is an individual average for each phase;
add each of the common mode injection voltages for each phase to their respective of the individual references from the set of predetermined reference voltages for each phase; and
control a modulation index in response thereto for each phase, such that each generated output phase voltage level for each phase is adjusted in response to its corresponding modulation index.

6. The multi-phase power converter according to claim 5, wherein each phase path comprises at least one H-bridge inverter.

* * * * *